(12) United States Patent
Liu et al.

(10) Patent No.: US 9,235,542 B2
(45) Date of Patent: Jan. 12, 2016

(54) SIGNAL SWITCHING CIRCUIT AND PERIPHERAL COMPONENT INTERCONNECT EXPRESS CONNECTOR ASSEMBLY HAVING THE SIGNAL SWITCHING CIRCUIT

(71) Applicant: Zhongshan Innocloud Intellectual Property Services Co., Ltd., Zhongshan (CN)

(72) Inventors: Lei Liu, Shenzhen (CN); Guo-Yi Chen, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 297 days.

(21) Appl. No.: 13/957,536

(22) Filed: Aug. 2, 2013

(65) Prior Publication Data

US 2014/0223070 A1 Aug. 7, 2014

(30) Foreign Application Priority Data

Jan. 30, 2013 (CN) .......................... 2013 1 00354514

(51) Int. Cl.
G06F 13/00 (2006.01)
G06F 13/38 (2006.01)
G06F 11/00 (2006.01)

(52) U.S. Cl.
CPC ..................................... *G06F 13/385* (2013.01)

(58) Field of Classification Search
CPC ................................. G06F 13/00; G06F 11/00
USPC .................................... 710/313–317; 711/4.5
See application file for complete search history.

(56) References Cited

U.S. PATENT DOCUMENTS

| | | | | |
|---|---|---|---|---|
| 5,913,045 | A * | 6/1999 | Gillespie | G06F 13/24 710/266 |
| 7,340,557 | B2 * | 3/2008 | Kong | G09G 5/363 710/306 |
| 7,539,801 | B2 * | 5/2009 | Xie | G06F 13/4221 710/104 |
| 7,573,295 | B1 * | 8/2009 | Stadler | H03K 19/17732 326/38 |
| 7,657,663 | B2 * | 2/2010 | Freimuth | G06F 13/4022 710/5 |
| 8,055,934 | B1 * | 11/2011 | Blinick | G06F 11/0727 714/10 |
| 8,473,663 | B2 * | 6/2013 | Somervill | G06F 13/4095 710/110 |
| 8,560,774 | B2 * | 10/2013 | Cleveland | G06F 11/2089 710/301 |

(Continued)

*Primary Examiner* — Christopher Shin
(74) *Attorney, Agent, or Firm* — Novak Druce Connolly Bove + Quigg LLP

(57) ABSTRACT

A signal switching circuit allows a PCIe card access to additional data channels when installation of the PCIe cards on first and second PCIe connectors are detected. First and second PCIe connectors output a first detection signal when each of the first and second PCIe connectors receives a PCIe card. The first and second PCIe connectors output a second detection signal when each of the first and second PCIe connectors does not receive a PCIe card. A first multiplexer receives the first or second detection signal and connects an input terminal to first or second output terminal of the first multiplexer, to transmit PCIe signals to the first or second PCIe connector. A second multiplexer receives the first or second detection signal and connects an input terminal to first or second output terminal of the second multiplexer, to transmit PCIe signals to the first or second PCIe connectors.

4 Claims, 1 Drawing Sheet

(56) References Cited

U.S. PATENT DOCUMENTS

| | | | | |
|---|---|---|---|---|
| 8,605,879 B2 * | 12/2013 | Wellard | H04M 3/42371 | |
| | | | 379/201.01 | |
| 8,615,622 B2 * | 12/2013 | Gregg | G06F 13/404 | |
| | | | 710/313 | |
| 8,645,606 B2 * | 2/2014 | Gregg | G06F 13/385 | |
| | | | 710/306 | |
| 8,677,176 B2 * | 3/2014 | Buckland | G06F 13/4022 | |
| | | | 714/4.1 | |
| 8,677,180 B2 * | 3/2014 | Bayer | G06F 11/2033 | |
| | | | 714/11 | |
| 8,745,292 B2 * | 6/2014 | Lais | G06F 13/4022 | |
| | | | 710/313 | |
| 8,769,180 B2 * | 7/2014 | Gregg | G06F 13/385 | |
| | | | 710/306 | |
| 8,918,573 B2 * | 12/2014 | Gregg | G06F 13/4027 | |
| | | | 710/313 | |
| 2011/0213910 A1 * | 9/2011 | Somervill | G06F 13/4095 | |
| | | | 710/316 | |
| 2011/0320653 A1 * | 12/2011 | Lais | G06F 13/4022 | |
| | | | 710/65 | |
| 2011/0320666 A1 * | 12/2011 | Gregg | G06F 13/4027 | |
| | | | 710/300 | |
| 2011/0320674 A1 * | 12/2011 | Gregg | G06F 13/385 | |
| | | | 710/314 | |
| 2011/0320675 A1 * | 12/2011 | Gregg | G06F 13/404 | |
| | | | 710/315 | |
| 2012/0120805 A1 * | 5/2012 | Maze | H04L 1/1835 | |
| | | | 370/235 | |
| 2012/0144087 A1 * | 6/2012 | Buckland | G06F 13/4068 | |
| | | | 710/316 | |
| 2012/0144230 A1 * | 6/2012 | Buckland | G06F 13/4022 | |
| | | | 714/4.5 | |
| 2013/0073759 A1 * | 3/2013 | Gregg | G06F 13/385 | |
| | | | 710/106 | |
| 2013/0073767 A1 * | 3/2013 | Gregg | G06F 13/4027 | |
| | | | 710/300 | |
| 2013/0076766 A1 * | 3/2013 | Yamagishi | G01C 21/32 | |
| | | | 345/522 | |
| 2013/0080678 A1 * | 3/2013 | Buckland | G06F 13/4068 | |
| | | | 710/316 | |
| 2013/0080825 A1 * | 3/2013 | Buckland | G06F 13/4022 | |
| | | | 714/4.5 | |

* cited by examiner

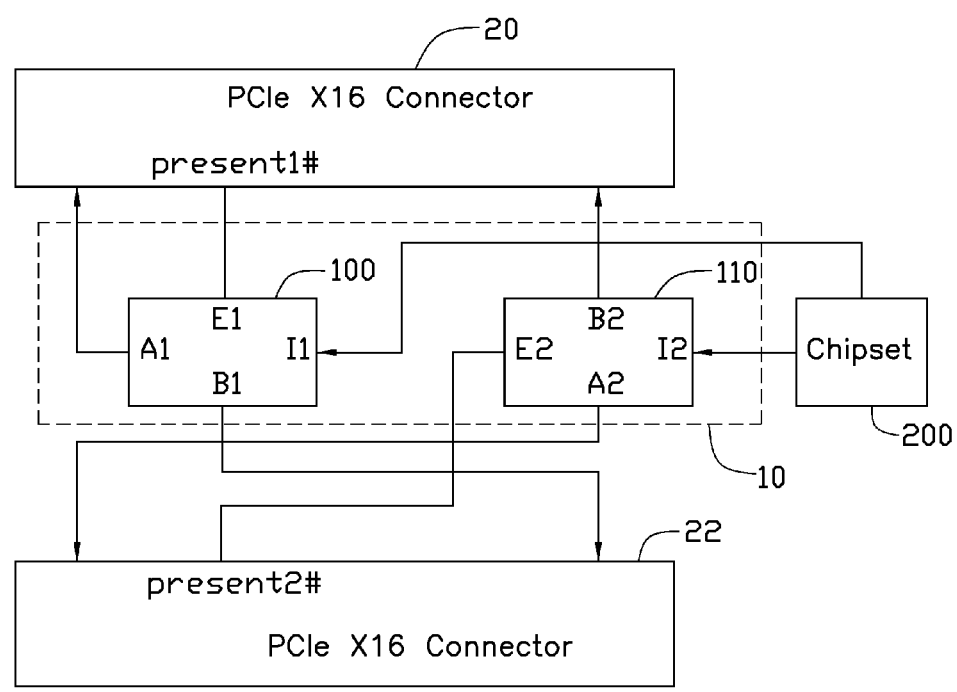

SIGNAL SWITCHING CIRCUIT AND PERIPHERAL COMPONENT INTERCONNECT EXPRESS CONNECTOR ASSEMBLY HAVING THE SIGNAL SWITCHING CIRCUIT

BACKGROUND

1. Technical Field

The present disclosure relates to a peripheral component interconnect express connector assembly having a signal switching circuit.

2. Description of Related Art

In general, a chipset arranged on a motherboard can provide sixteen pairs of data channels to two peripheral component interconnect express (PCIe) X16 connectors, which are arranged on the motherboard. Thus each PCIe X16 connector can transmit data through eight pairs of channels only. For example, when the chipset provides sixteen pairs of data channels, eight pairs of data channels are provided to a first PCIe X16 connector, and the other eight pairs of data channels are provided to a second PCIe X16 connector. When the first PCIe X16 connector receives a PCIe X16 card, and the second PCIe X16 connector is free, the added PCIe X16 card is able to communicate with the motherboard only through the original eight pairs of data channels. At the same time, the eight pairs of data channels of the second PCIe X16 connector are not used. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a circuit diagram of a signal switching circuit in accordance with an embodiment.

DETAILED DESCRIPTION

The disclosure, including the drawing, is illustrated by way of example and not by way of limitation. References to "an" or "one" embodiment in this disclosure are not necessarily to the same embodiment, and such references mean "at least one."

The FIGURE shows a signal switching circuit 10 in accordance with an embodiment. The signal switch circuit 10 is arranged on a motherboard 1. A chipset 200 is arranged on the motherboard 1 and provides sixteen pairs of data channels, which accord with peripheral component interconnect express (PCIe) protocol. In one embodiment, two PCIe X16 connectors 20 and 22 are arranged on the motherboard 1.

The signal switch circuit 10 includes two multiplexers 100 and 110. Input terminals I1 and I2 of the multiplexers 100 and 110 are connected to the chipset 200, each of the input terminals I1 and I2 receiving eight pairs of the data channels from the chipset 200. A first output terminal A1 of the multiplexer 100 is connected to the PCIe X16 connector 20, and a second output terminal B1 of the multiplexer 100 is connected to the PCIe X16 connector 22, to output the eight pairs of data channels to the PCIe X16 connector 20 or to the PCIe X16 connector 22. A first output terminal A2 of the multiplexer 110 is connected to the PCIe X16 connector 22, and a second output terminal B2 of the multiplexer 110 is connected to the PCIe X16 connector 20, to output the eight pairs of data channels to the PCIe X16 connector 22 or the PCIe X16 connector 20.

An enable terminal E1 of the multiplexer 100 is connected to a detection pin Present1# of the PCIe X16 connector 20. An enable terminal E2 of the multiplexer 110 is connected to a detection pin Present2# of the PCIe X16 connector 22. The multiplexer 100 can connect the input terminal I1 to the first output terminal A1 or to the second output terminal B1, according to voltage level of signals received by the enable terminal E1, to output eight pairs of data channels received from the chipset 200 to the PCIe X16 connectors 20 and 22. The multiplexer 110 can connect the input terminal I2 to the first output terminal A2 or to the second output terminal B2, according to voltage level of signals received by the enable terminal E2, to output eight pairs of data channels received from the chipset 200 to the PCIe X16 connectors 20 and 22.

When the PCIe X16 connector 20 receive a PCIe X16 card, and the PCIe X16 connector 22 does not receive a PCIe X16 card, the detection pin Present1# of the PCIe X16 connector 20 receives a low level signal, such as logic 0, and the detection pin Present2# of the PCIe X16 connector 22 receives a high level signal, such as logic 1. Thus the enable terminal E1 of the multiplexer 100 receives a low level signal, and the enable terminal E2 of the multiplexer 110 receives a high level signal. The input terminal I1 is connected to the first output terminal A1 of the multiplexer 100, and the input terminal I2 is connected to the second output terminal B2 of the multiplexer 110. Eight pairs of data channels received from the chipset 200 by the multiplexer 100 are outputted to the PCIe X16 connector 20, and eight pairs of channel data received from the chipset 200 by the multiplexer 110 are also outputted to the PCIe X16 connector 20. The PCIe X16 connector 20 thus receives sixteen pairs of data channels.

When the PCIe X16 connector 20 does not receives a card, and the PCIe X16 connector 22 receives a PCIe X16 card, the detection pin Present1# of the PCIe X16 connector 20 receives a high level signal, and the detection pin Present2# of the PCIe X16 connector 22 receives a low level signal. The enable terminal E1 of the multiplexer 100 thus receives a high level signal, and the enable terminal E2 of the multiplexer 110 receives a low level signal. The input terminal I1 is connected to the second output terminal B1 of the multiplexer 100, and the input terminal I2 is connected to the first output terminal A2 of the multiplexer 110. The eight pairs of data channels received from the chipset 200 by the multiplexer 100 are thus outputted to the PCIe X16 connector 22, and eight pairs of data channels received from the chipset 200 by the multiplexer 110 are also outputted to the PCIe X16 connector 22. The PCIe X16 connector 22 thus receives sixteen pairs of data channels.

When the PCIe X16 connector 20 receives a PCIe X16 card, and the PCIe X16 connector 22 also receives a PCIe X16 card, the detection pin Present1# of the PCIe X16 connector 20 receives a low level signal, and the detection pin Present2# of the PCIe X16 connector 22 also receives a low level signal. Thus the enable terminal E1 of the multiplexer 100 and the enable terminal E2 of the multiplexer 110 both receive low level signals. The input terminal I1 is connected to the first output terminal A1 of the multiplexer 100, and the input terminal I2 is connected to the first output terminal A2 of the multiplexer 110. Eight pairs of data channels received from the chipset 200 by the multiplexer 100 are outputted to the PCIe X16 connector 20, and eight pairs of data channels received from the chipset 200 by the multiplexer 110 are outputted to the PCIe X16 connector 22. In this case, each of the PCIe X16 connectors 20 and 22 receives eight pairs of data channels.

The multiplexers 100 and 110 detect when the PCIe X16 connectors 20 and 22 receive PCIe X16 cards through the enable terminals E1 and E2 and the detection pins Present1# and Present2#, and connect the input terminal to the corresponding first output terminal or to the corresponding second output terminal, to output a further eight pairs of data channels to the PCIe X16 connector 20 or to the PCIe X16 connector 22.

In other embodiments, the PCIe X16 connectors 20 and 22 may be replaced by PCIe X8 and PCIe X32 connectors. That is, the input terminal I1 of the multiplexer 100 is connected to a first group of pins of the chipset 200, to receive a first group of data channels from the chipset 200. The input terminal I2 of the multiplexer 110 is connected to a second group of pins of the chipset 200, to receive a second group of data channels from the chipset 200. The first output terminal A1 of the multiplexer 100 is connected to a first group of pins of a first PCIe connector, and the second output terminal B1 of the multiplexer 100 is connected to a first group of pins of a second PCIe connector, to transmit the first group of data channels from the chipset 200 to the first group of pins of the first PCIe connector or to the second PCIe connector. The first output terminal A2 of the multiplexer 110 is connected to the second group of pins of the second PCIe connector, and the second output terminal B2 of the multiplexer 110 is connected to the second group of pins of the first PCIe connector, to transmit the second group of data channels from the chipset 200 to the second group of pins of the first PCIe connector or to the second PCIe connector. The enable terminals E1 and E2 of the multiplexer 100 and 110 are respectively connected to the detection pins of the first and second PCIe connectors.

Even though numerous characteristics and advantages of the disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A signal switching circuit connected between a first peripheral component interconnect express (PCIe) connector and a second PCIe connector, the signal switching circuit comprising:
   a first multiplexer comprising an input terminal, a first output terminal, a second output terminal, and an enable terminal, wherein the input terminal is connected to a first group of pins of a chipset of a motherboard, to receive a first group of PCIe signals, the first output terminal is connected to a first group of pins of the first PCIe connector, the second output terminal is connected to a first group of pins of the second PCIe connector, the enable terminal is connected to a detection pin of the first PCIe connector; and
   a second multiplexer comprising an input terminal, a first output terminal, a second output terminal, and an enable terminal, wherein the input terminal of the second multiplexer is connected to a second group of pins of the chipset, to receive a second group of PCIe signals, the first output terminal of the second multiplexer is connected to a second group of pins of the second PCIe connector, the second output terminal of the second multiplexer is connected to a second group of pins of the first PCIe connector, the enable terminal of the second multiplexer is connected to a detection pin of the second PCIe connector;
   wherein the detection pin of each of the first and second PCIe connectors outputs a first detection signal when each of the first and second PCIe connectors receives a PCIe card, the detection pin of each of the first and second PCIe connectors outputs a second detection signal when each of the first and second PCIe connectors does not receive a PCIe card, the first multiplexer receives the first or second detection signal through the enable terminal and connects the input terminal to the first or the second output terminal of the first multiplexer, to transmit the received PCIe signals to the first or the second PCIe connector, the second multiplexer receives the first or second detection signal through the enable terminal and connects the input terminal to the first or the second output terminal of the second multiplexer, to transmit the received PCIe signals to the first or the second PCIe connectors.

2. The signal switch circuit of claim 1, wherein the first and second PCIe connectors are PCIe X16 connectors, the first and second groups of PCIe signals each are eight pairs of channel data; when the first PCIe connector receives a PCIe X16 card, the detection pin of the first PCIe connector outputs a low level signal, when the first PCIe connector does not receive a PCIe card, the detection pin of the first PCIe connector outputs a high level signal; when the second PCIe connector receives a PCIe X16 card, the detection pin of the second PCIe connector outputs a low level signal, when the second PCIe X16 connector does not receive a PCIe card, the detection pin of the second PCIe connector outputs a high level signal; when the enable terminal of the first multiplexer receives the low level signal, the first multiplexer connects the input terminal to the first output terminal of the first multiplexer, when the enable terminal of the first multiplexer receives the high level signal, the first multiplexer connects the input terminal to the second output terminal of the first multiplexer; when the enable terminal of the second multiplexer receives the low level signal, the second multiplexer connects the input terminal to the first output terminal of the second multiplexer, when the enable terminal of the second multiplexer receives the high level signal, the second multiplexer connects the input terminal to the second output terminal of the second multiplexer.

3. A peripheral component interconnect express (PCIe) connector assembly comprising:
   a first multiplexer comprising an enable terminal, an input terminal, a first output terminals, and a second output terminal, wherein the input terminal is connected to a first group of pins of a chipset of a motherboard, to receive a first group of PCIe signals from the chipset;
   a second multiplexer comprising an enable terminal, an input terminal, a first output terminals, and a second output terminal, wherein the input terminal is connected to a second group of pins of the chipset, to receive a second group of PCIe signals from the chipset;
   a first PCIe connector, wherein a first group of pins of the first PCIe connector is connected to the first output terminal of the first multiplexer, a second group of pins of the first PCIe connector is connected to the second output terminal of the second multiplexer, a detection pin of the first PCIe connector is connected to the enable terminal of the first multiplexer, to output a detection signal to the enable terminal of the first multiplexer according to the first PCIe connector receiving a PCIe card or not; and a second PCIe connector, wherein a first group of pins of the second PCIe connector is connected to the second output terminal of the first multiplexer, a second group of pins of the second PCIe connector is connected to the first output terminal of the second multiplexer, the detection pin of the second PCIe connector is connected to the enable terminal of the second multiplexer, to output a detection signal to the enable terminal of the second multiplexer according to the second PCIe connector receiving a PCIe card or not;

wherein the first multiplexer connects the input terminal to the first output terminal or the second output terminal according to the detection signal received by the enable terminal of the first multiplexer, the first multiplexer outputs the first group of PCIe signals received from the chipset to the first group of pins of the first or the second PCIe connector; the second multiplexer connects the input terminal to the first output terminal or the second output terminal according to the detection signal received by the enable terminal of the second multiplexer, the second multiplexer outputs the second group of PCIe signals received from the chipset to the second group of pins of the first or the second PCIe connector.

4. The PCIe connector assembly of claim 3, wherein the first and second PCIe connectors are PCIe X16 connectors, the first and second groups of PCIe signals each are eight pairs of channel data; when the first PCIe connector receives a PCIe X16 card, the detection pin of the first PCIe connector outputs a low level signal, when the first PCIe connector does not receives a PCIe card, the detection pin of the first PCIe connector outputs a high level signal; when the second PCIe connector receives a PCIe X16 card, the detection pin of the second PCIe connector outputs a low level signal, when the second PCIe X16 connector does not receive a PCIe card, the detection pin of the second PCIe connector outputs a high level signal; when the enable terminal of the first multiplexer receives the low level signal, the first multiplexer connects the input terminal to the first output terminal of the first multiplexer, when the enable terminal of the first multiplexer receives the high level signal, the first multiplexer connects the input terminal to the second output terminal of the first multiplexer; when the enable terminal of the second multiplexer receives the low level signal, the second multiplexer connects the input terminal to the first output terminal of the second multiplexer, when the enable terminal of the second multiplexer receives the high level signal, the second multiplexer connects the input terminal to the second output terminal of the second multiplexer.

* * * * *